United States Patent
Steinbrenner et al.

(10) Patent No.: US 7,074,944 B2
(45) Date of Patent: Jul. 11, 2006

(54) METHOD FOR PRODUCING POLYTETRAHYDROFURAN

(75) Inventors: Ulrich Steinbrenner, Neustadt (DE); Martin Haubner, Eppelheim (DE); Achim Gerstlauer, Ludwigshafen (DE); Thomas Domschke, Speyer (DE); Christoph Sigwart, Schriesheim (DE); Stefan Käshammer, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 333 days.

(21) Appl. No.: 10/485,685

(22) PCT Filed: Jul. 26, 2002

(86) PCT No.: PCT/EP02/08340

§ 371 (c)(1),
(2), (4) Date: Feb. 3, 2004

(87) PCT Pub. No.: WO03/014189

PCT Pub. Date: Feb. 20, 2003

(65) Prior Publication Data

US 2004/0186269 A1    Sep. 23, 2004

(30) Foreign Application Priority Data

Aug. 9, 2001 (DE) .................. 101 39 293

(51) Int. Cl.
*C07D 307/77* (2006.01)
(52) U.S. Cl. .................... 549/429
(58) Field of Classification Search ................ 549/429
See application file for complete search history.

(56) References Cited

U.S. PATENT DOCUMENTS 5,886,138 A   3/1999   Mueller
6,362,312 B1  3/2002   Eller et al.

FOREIGN PATENT DOCUMENTS

WO   99/36459   7/1999

OTHER PUBLICATIONS

Tanabe et al, Studies in Surface Sci. and Catalysis, vol. 51, 108-128, 1989.
Tanabe et al. Studes in Surface Sci. and Catalysis vol. 51, 199-210, 1989.

*Primary Examiner*—Taofiq Solola
(74) *Attorney, Agent, or Firm*—Novak Druce & Quigg, LLP; Jason D. Voight

(57) ABSTRACT

In a process for the single-stage preparation of polytetrahydrofuran and/or tetrahydrofuran copolymers having a mean molecular weight of from 650 to 5000 dalton by polymerization of tetrahydrofuran over an acid catalyst in the presence of at least one telogen and/or comonomer, the telogen and/or comonomer is added at at least two addition points in different segments of the polymerization apparatus.

8 Claims, No Drawings

METHOD FOR PRODUCING POLYTETRAHYDROFURAN

The present invention relates to a process for preparing polytetrahydrofuran or tetrahydrofuran copolymers by polymerization of tetrahydrofuran over an acid catalyst, preferably a heterogeneous acid catalyst, in the presence of at least one telogen and/or comonomer, wherein the telogen and/or comonomer is added at at least two addition points in different segments of the polymerization apparatus.

Polytetrahydrofuran, hereinafter referred to as PTHF and also known as polyoxybutylene glycol, is used as a versatile intermediate in the plastics and synthetic fibers industries and is employed, inter alia, for producing polyurethane, polyester and polyamide elastomers. In addition, it is, like some of its derivatives, a valuable auxiliary in many applications, for example as dispersant or in the deinking of waste paper.

PTHF is usually prepared industrially by polymerization of tetrahydrofuran, hereinafter referred to as THF for short, over suitable catalysts. The addition of suitable reagents enables the length of the polymer chains to be controlled, and the mean molecular weight can thus be set to the desired value. Control is achieved by choice of type and amount of the telogen. Such reagents are referred to as chain termination reagents or "telogens". Selection of appropriate telogens also enables functional groups to be introduced at one or both ends of the polymer chain.

Thus, for example, the use of carboxylic acids or carboxylic anhydrides as telogens results in formation of the monoesters or diesters of PTHF which subsequently have to be converted into PTHF by saponification or transesterification. These processes are therefore referred to as two-stage PTHF processes.

Other telogens act not only as chain termination reagents but are also incorporated into the growing polymer chain of the PTHF. They have not only the function of a telogen but simultaneously act as a comonomer and can therefore be referred to as either telogens or comonomers with equal justification. Examples of such comonomers are telogens having two hydroxy groups, e.g. diols (dialcohols). These can be, for example, ethylene glycol, propylene glycol, butylene glycol, 1,3-propanediol, 1,4-butanediol, 2-butyne-1,4-diol, 1,6-hexanediol or low molecular weight PTHF. Further suitable comonomers are cyclic ethers such as 1,2-alkylene oxides, for example, ethylene oxide or propylene oxide, 2-methyltetrahydrofuran or 3-methyltetrahydrofuran. The use of such comonomers leads, with the exception of water, 1,4-butanediol and low molecular weight PTHF, to formation of tetrahydrofuran copolymers, hereinafter referred to as THF copolymers, and in this way makes it possible to achieve chemical modification of PTHF.

In industry, use is predominantly made of two-stage processes in which tetrahydrofuran is, for example, polymerized in the presence of fluorosulfonic acid to form polytetrahydrofuran esters and these are subsequently hydrolyzed to polytetrahydrofuran. As an alternative, tetrahydrofuran is, for example, polymerized with acetic anhydride in the presence of acid catalysts to form polytetrahydrofuran diacetate which is subsequently transesterified, e.g. by means of methanol, to give polytetrahydrofuran. Disadvantages of such processes are that they have to be carried out in two stages and that by-products such as hydrofluoric acid and methyl acetate are formed.

The single-stage synthesis of PTHF is carried out by polymerization of THF using water, 1,4-butanediol or low molecular weight PTHF as telogen over acid catalysts. Known catalysts include both systems which are homogeneously dissolved in the reaction system and heterogeneous, i.e. largely undissolved, systems.

It is an object of the present invention to provide an economical process by means of which polytetrahydrofuran and/or tetrahydrofuran copolymers having a particular mean molecular weight can be prepared in higher polymer yields and/or space-time yields.

We have found that this object is achieved by a process for preparing polytetrahydrofuran (PTHF) and/or tetrahydrofuran copolymers (THF copolymers) by polymerization of tetrahydrofuran over a heterogeneous acid catalyst in the presence of at least one telogen and/or comonomer, wherein the telogen and/or comonomer is added at at least two addition points in different segments of the polymerization apparatus.

The process of the present invention makes it possible to obtain PTHF and THF copolymers having a particular mean molecular weight in high space-time yield and at a high conversion, with the process of the present invention being able to be carried out in one stage or in two stages. However, preference is given to the single-stage synthesis of PTHF.

It has surprisingly been found that the cascaded addition of the telogen and/or comonomer at at least two different addition points in different segments of the polymerization apparatus enables the space-time yield and conversion to be improved significantly. The number of addition points can be two, three, four, five or more and depends on the polymerization apparatus used, in particular its type and capacity, and also on process engineering and economic boundary conditions. However, preference is generally given to using from 2 to 5 addition points.

Examples of suitable polymerization apparatuses are cascades of at least two tank or tube reactors, for example cascades of stirred tanks, cascades of at least two fixed-bed reactors, which may optionally be operated with circulation, and cascades of loop reactors. In these polymerization apparatuses, one segment in which an addition point for the telogen and/or comonomer is located corresponds to a tank or a tube. However, it is not necessary for each segment of the polymerization apparatus in which an addition point for the telogen and/or comonomer is located to be a single unit such as a stirred tank. Rather, a reactor can be configured so that it fulfills the function of a plurality of reactor elements connected in series. It is therefore also possible to use a single reactor, in particular a fixed-bed reactor, which is divided into at least two, preferably from 2 to 5, segments by means of suitable internals, for example orifice plates or sieve trays. Furthermore, it is possible to use stirred columns having more than one stage and flow tubes, each having at least two addition points. Particular preference is given to cascades of stirred tanks comprising at least two stirred tanks, preferably from 2 to 5 tanks.

The telogen can be introduced into the polymerization either separately on its own or as a solution in the THF, with preference being given to a telogen content of from 1 to 50 mol %, based on tetrahydrofuran. Comonomers can likewise be introduced into the polymerization as solutions in THF, in which case the comonomer content can be up to 30 mol %, preferably 20 mol %, based on tetrahydrofuran. However, the THF and the telogen and/or comonomer are preferably introduced separately into the polymerization reactor.

Since the telogen effects termination of the polymerization, the mean molecular weight of the PTHF or the THF copolymers can be controlled via the amount of telogen used. The more telogen present in the reaction mixture, the lower the mean molecular weight of the resulting PTHF or THF copolymers. Depending on the telogen content of the polymerization mixture, it is possible to prepare PTHF and THF copolymers having mean molecular weights of from 650 to 5 000 dalton, preferably from 650 to 3 000 dalton and particularly preferably from 1 000 to 3 000 dalton.

The amount of telogen and/or comonomer added at each of the two or more addition points can be identical or different. At least 5% by weight of the total amount of telogen and/or comonomer, preferably at least 10% by weight, particularly preferably at least 15% by weight, are added after the first addition point, i.e. at the second addition point or distributed over the second to n-th addition points. Consequently, the addition at the beginning of the polymerization unit, i.e. at the first addition point, is not more than 95% by weight, preferably not more than 90% by weight and particularly preferably not more than 85% by weight.

The addition of the telogen and/or comonomer can be controlled by setting the mean molecular weight of the PTHF or THF copolymer in each segment of the polymerization apparatus, in the case of a cascade of stirred tanks, in each tank, via the amount of telogen and/or comonomer added in this segment so that this mean molecular weight corresponds to the mean molecular weight to be achieved for the end product. To achieve this, telogen and/or comonomer is introduced empirically, the mean molecular weight of a sample is determined in a known manner, and the telogen and/or comonomer addition is altered as a function of the result of this determination.

Apart from control via the mean molecular weight, the amount of telogen and/or comonomer can also be controlled so that each segment displays the same incremental productivity based on the amount of catalyst. The productivity ("prod") is calculated, as described below in the present patent application, from throughput, catalyst content and difference between evaporation residue ("ER") at the inlet and outlet of a segment. The evaporation residue can be determined with sufficient accuracy from intrinsic properties of the feed stream and the exit stream, preferably from the index of refraction, with the aid of a calibration curve. In the present context, the feed stream is the stream of reaction mixture introduced into the segment and the exit stream is the stream of reaction mixture leaving the segment. Control of the telogen and/or comonomer addition both via the mean molecular weight and via the incremental productivity requires repeated sampling, determinations and, as a function of their results, changes to the addition.

If continuous control by means of the mean molecular weight or the incremental productivity is considered too complicated, it is also possible to determine a value T for the amount of telogen and/or comonomer/segment of the polymerization apparatus for the respective desired end product once for each segment by means of the mean molecular weight or the incremental productivity and then to add from 25 to 400% of T, preferably from 33 to 300%, particularly preferably from 50 to 200%, at each addition point. In this case, the amount of telogen and/or comonomer added can be identical or different at each of the various addition points.

The physical control of the telogen and/or comonomer addition in the various segments of the polymerization apparatus is carried out in a manner known per se by means of individual pumps, valves, nozzles, orifice plates, slits, membranes, filter plates or capillary tubes.

Suitable telogens and/or comonomers in the preferred single-stage process of the present invention are saturated or unsaturated, unbranched or branched alpha, omega-$C_2$-$C_{12}$- diols, water, polytetrahydrofuran having a molecular weight of from 200 to 700 dalton, cyclic ethers or mixtures thereof.

Preference is given to water, ethylene glycol, 1,3-propanediol, 1,4-butanediol, 1,5-pentanediol, 1,6-hexanediol, polytetrahydrofuran having a molecular weight of from 200 to 700 dalton, 1,6-hexanediol, 1,8-octanediol, 1,10-decanediol, 2-butyne-1,4-diol and neopentyl glycol or mixtures thereof, with particular preference being given to water, 1,4-butanediol and/or polytetrahydrofuran having a molecular weight of from 200 to 700 dalton.

Telogens used for preparing PTHF and THF copolymers by the two-stage method are carboxylic anhydrides and/or carboxylic anhydride/protic acid mixtures. Preferred carboxylic anhydrides, which are derived from aliphatic or aromatic polycarboxylic or monocarboxylic acids, contain from 2 to 12, preferably from 1 to 8, carbon atoms. Particular preference is given to acetic anhydride. The protic acids are preferably organic and inorganic acids which are soluble in the reaction system. Preferred carboxylic acids are aliphatic or aromatic polycarboxylic and/or monocarboxylic acids containing from 2 to 12, preferably from 1 to 8, carbon atoms. Examples of aliphatic carboxylic acids are acetic acid, lactic acid, propionic acid, valeric acid, caproic acid, caprylic acid and pelargonic acid. Examples of aromatic carboxylic acids are phthalic acid and naphthalenecarboxylic acid. Among these carboxylic acids, preference is given to using acetic acid.

Suitable comonomers are cyclic ethers which can be polymerized with opening of the ring, preferably three-membered, four-membered and five-membered rings such as 1,2-alkylene oxides, for example ethylene oxide or propylene oxide, oxetane, substituted oxetanes such as 3,3-dimethyloxetane, and the THF derivatives 2-methyltetrahydrofuran and 3-methyltetrahydrofuran. Particular preference is given to 2-methyltetrahydrofuran or 3-methyltetrahydrofuran.

As polymerization catalysts, it is possible to use homogeneous acid catalysts and heterogeneous acid catalysts. Among the suitable homogeneous catalysts, particular mention may be made of heteropolyacids.

Examples of heteropolyacids which can be used as catalysts in the process of the present invention are the following compounds:

dodecamolybdophosphoric acid ($H_3PMo_{12}O_{40}$*n $H_2O$),
dodecamolybdosilicic acid ($H_4SiMo_{12}O_{40}$*n $H_2O$),
dodecamolybdoceric(IV) acid ($H_8CeMo_{12}O_{42}$*n $H_2O$),
dodecamolybdoarsenic(V) acid ($H_3AsMo_{12}O_{42}$*n $H_2O$),
hexamolybdochromic(III) acid ($H_3CrMo_6O_{24}H_6$*n $H_2O$),
hexamolybdonickelic(II) acid ($H_4NiMo_6O_{24}H_6$*5 $H_2O$),
hexamolybdoiodic acid ($H_5JMo_6O_{24}$*n $H_2O$),
octadecamolybdodiphosphoric acid ($H_6P_2Mo_{18}O_{62}$*11 $H_2O$),
octadecamolybdodiarsenic(V) acid ($H_6As_2Mo_{18}O_{62}$*25 $H_2O$),
nonamolybdomanganic(IV) acid ($H_6MnMo_9O_{32}$*n $H_2O$),
undecamolybdovanadophosphoric acid ($H_4PMo_{11}VO_{40}$*n $H_2O$),
decamolybdodivanadophosphoric acid ($H_5PMo_{10}V_2O_{40}$*n $H_2O$),
dodecavanadophosphoric acid ($H_7PV_{12}O_{36}$*n $H_2O$),
dodecatungstosilicic acid ($H_4SiW_{12}O_{40}$*7 $H_2O$),
dodecatungstoboric acid ($H_5BW_{12}O_{40}$*n $H_2O$),
octadecatungstodiphosphoric acid ($H_6P_2W_{18}O_{62}$*14 $H_2O$),
octadecatungstodiarsenic(V) acid ($H_6As_2W_{18}O_{62}$*14 $H_2O$),
hexamolybdohexatungstophosphoric acid ($H_3PMo_6W_6O_{40}$*n $H_2O$).

Of course, it is also possible to use mixtures of heteropolyacids. Due to their ready availability, preference is given to using dodecatungstophosphoric acid, dodecamolybdophosphoric acid, nonamolybdophosphoric acid, dodecamolybdosilicic acid and dodecatungstosilicic acid in the process of the present invention.

According to the present invention, preference is given to using the free heteropolyacids as catalysts, but it is also possible to utilize their salts, in particular their alkali metal and alkaline earth metal salts, as catalysts. The heteropolyacids and their salts are known compounds and can be prepared by known methods, for example by the methods described in Brauer (Editor): Handbuch der Präparativen Anorganischen Chemie, Volume III, Enke, Stuttgart, 1981 or the methods described in Top. Curr. Chem. 76, 1 (1978).

The heteropolyacids prepared by these methods are generally in hydrated form. They are preferably freed of the coordinated water present therein before they are used in the process of the present invention. This dehydration can advantageously be carried out thermally, for example by the method described in Makromol. Chem. 190, 929 (1989).

Preferred polymerization catalysts are heterogeneous acid catalysts which contain acid centers having an acid strength $H_0$ of $<+2$ in a concentration of at least 0.005 mmol/g of catalyst, particularly preferably an acid strength $H_0$ of $<+1.5$ in a concentration of at least 0.01 mmol/g of catalyst.

Heterogeneous polymerization catalysts which can be used in the process of the present invention are supported heteropolyacids, cesium salts of heteropolyacids, sulfate- or phosphate-doped metal oxides of groups IVA, VIIA and VIIIA of the Periodic Table of the Elements, if desired acid-activated sheet silicates or zeolites, polymers comprising alpha-fluorosulfonic acids, mixed acid metal oxides of groups IIIB, IVB, IIIA to VIIIA of the Periodic Table of the Elements, supported catalysts comprising an oxidic support material and a catalytically active amount of a tungsten or molybdenum compound or mixtures of such compounds, with preference being given to supported catalysts comprising an oxidic support material and a catalytically active amount of a tungsten or molybdenum compound or mixtures of such compounds.

Suitable supported heteropolyacids are, for example, heteropolyacids of the formulae $H_3PM_{12}O_{40}$ (dodecamolybdophosphoric acid, dodecatungstophosphoric acid) and $H_3SiM_{12}O_{40}$ (dodecamolybdosilicic acid, dodecatungstosilicic acid), where M is molybdenum and/or tungsten, which are supported on customary support materials such as activated carbon, silicon dioxide, on mesoporous silicon oxides grafted with sulfonic acids, as are obtained by treatment of the mesoporous silicon oxide supports with mercaptoalkyltrialkoxysilanes and subsequent oxidation, for example using hydrogen peroxide or nitric acid, clays, polymers or zeolites such as MCM-41. Such supported heteropolyacids are described, for example, in T. Okuhara, N. Miszuno and M. Misono, Catalytic Chemistry of Heteropoly Compound, Adv. Catal. 41, 1996, Acad. Press, page 113 ff. The acid cesium salts of the heteropolyacids described in this reference, for example $Cs_{2.5}H_{0.5}PW_{12}O_{40}$, are also suitable for use as polymerization catalyst in the process of the present invention.

As sulfate-doped metal oxides of groups IVA, VIIA and VIIIA, preference is given to sulfate-doped zirconium dioxide and titanium dioxide, sulfate-doped mixed oxides of iron (III) and zirconium dioxide and also sulfate- or phosphate-doped mixed oxides of manganese and zirconium dioxide. The preparation of these sulfate-doped metal oxides is carried out by methods known per se. Thus, sulfate-doped zirconium dioxide which is suitable for the process of the present invention can be prepared, for example, by the process described in U.S. Pat. No. 5,149,862.

Apart from sulfate-doped metal oxides, it is also possible to use polymers comprising alpha-fluorosulfonic acid as polymerization catalyst. Preference is given to perfluorinated polymers comprising alpha-fluorosulfonic acid which are marketed, for example, under the trade name Nafion® by E. I. du Pont de Nemours and Company and under the trade names Amberlyst® 15 and Amberlyst® 36 by Rohm and Haas.

Furthermore, it is possible to use mixed acid metal oxides of groups IIIB, IVB, IIIA to VIIIA of the Periodic Table of the Elements, in particular $WO_3$—$TiO_2$, $WO_3$—$ZrO_2$, $WO_3$—$SnO_2$, $MoO_3$—$TiO_2$, $MoO_3$—$ZrO_2$, $MoO_3$—$SnO_2$, $V_2O_5$—$WO_3$—$TiO_2$, $TiO_2$—$SiO_2$, $ZrO_2$—$SiO_2$, $Al_2O_3$—$SiO_2$, as are described in K. Tanabe, M. Misono, Y. Ono and H. Hattori, New Solid acids and Bases, Stud. Surf. Sciences and Catal. 51, in particular pages 108–128 and 199–210, Elsevier 1989, in the process of the present invention.

Suitable supported catalysts which comprise an oxidic support material and oxygen-containing molybdenum or tungsten compounds or mixtures of such compounds as catalytically active compounds and may also, if desired, be additionally doped with sulfate or phosphate groups are described in DE-A 44 33 606, which is hereby expressly incorporated by reference. These catalysts can be pretreated with a reducing agent, preferably with hydrogen, as described in DE 19641481 which is hereby expressly incorporated by reference.

Further suitable catalysts are the supported catalysts described in the German patent application DE 19649803, which is hereby likewise expressly incorporated by reference, which comprise a catalytically active amount of at least one oxygen-containing molybdenum and/or tungsten compound as active composition and have been calcined at from 500° C. to 1 000° C. after application of the precursor compounds of the active composition to the support material precursor, and further comprise a promoter which comprises at least one element or a compound of an element of group 2, 3 including the lanthanides, 5, 6, 7, 8 or 14 of the Periodic Table of the Elements. These catalysts generally contain from 0.01 to 30% by weight, preferably from 0.05 to 20% by weight and particularly preferably from 0.1 to 15% by weight, of promoter, calculated as the sum of its constituents in the form of their elements and based on the total weight of the catalyst.

The catalysts which are known from DE-A 44 33 606 and DE 196 49 803 and can be employed according to the present invention generally contain from 0.1 to 50% by weight of the catalytically active, oxygen-containing compounds of molybdenum or tungsten or of mixtures of the catalytically active, oxygen-containing compounds of these metals, in each case based on the total weight of the catalyst and, since the chemical structure of the catalytically active, oxygen-containing compounds of molybdenum and/or tungsten is not known precisely, in each case calculated as $MoO_3$ and/or $WO_3$.

The German patent application DE 10032267.0 "Katalysator und Verfahren zur Herstellung von Polytetrahydrofuran" describes catalysts which can be employed according to the present invention and comprise at least one catalytically active, oxygen-containing molybdenum and/or tungsten compound on an oxidic support and in which the content of molybdenum and/or tungsten, based on the catalyst dried under nitrogen at 400° C., is x μmol of (tungsten and/or molybdenum)/$m^2$ of surface area, where $10.1 < x < 20.9$. The catalyst activity was able to be increased significantly by targeted setting of the ratio of the tungsten and/or molybdenum content to the BET surface area.

Furthermore, the German patent application DE 10032268.9 "Verbesserter Katalysator und Verfahren zur Herstellung von Polytetrahydrofuran" filed on the same day describes catalysts which can be used according to the present invention and comprise at least one catalytically active, oxygen-containing molybdenum and/or tungsten compound on an oxidic support and have been calcined at from 400° C. to 900° C. after application of the precursor compounds of the catalytically active compounds to the support material or a support material precursor. These catalysts are porous and contain transport pores having a diameter of <25 nm and have a volume of these transport pores of at least 50 mm$^3$/g.

The catalysts described in these two applications contain from 0.1 to 70% by weight, preferably from 5 to 40% by weight and particularly preferably from 10 to 35% by weight, of the catalytically active oxygen-containing molybdenum and/or tungsten compound(s), calculated as $MoO_3$ and/or $WO_3$ and based on the total weight of the catalyst.

Suitable oxidic supports for the catalysts comprising oxygen-containing molybdenum or tungsten compounds or mixtures of such compounds as catalytically active compounds are, for example, zirconium dioxide, titanium dioxide, hafnium oxide, yttrium oxide, iron(III) oxide, aluminum oxide, tin(IV) oxide, silicon dioxide, zinc oxide or mixtures of these oxides. Particular preference is given to zirconium dioxide, titanium dioxide and/or silicon dioxide, in particular titanium dioxide.

Apart from the abovementioned polymerization catalysts, it is possible to use sheet silicates or zeolites which may, if desired, have been activated by acid treatment as heterogeneous catalysts in the process of the present invention. As sheet silicates, preference is given to using those of the montmorillonite-saponite, kaolin-serpentine or palygorskite-sepiolite group, particularly preferably montmorillonite, hectorite, kaolin, attapulgite, beiddellite or sepiolite, as are described, for example, in Klockmanns Lehrbuch der Mineralogie, 16$^{th}$ edition, F. Euke Verlag 1978, pages 739–765.

In the process of the present invention, it is possible to use, for example, the montmorillonites available under the trade names Tonsil®, Terrana® and Granosil or as catalysts of the types Tonsil® K 10, KSF-O, KO or KS from Süd-Chemie AG, Munich. Attapulgites suitable for use in the process of the present invention are, for example, marketed by Engelhard Corporation, Iselin, USA, under the trade names Attasorb® RVM and Attasorb® LVM.

The term zeolites refers to a class of aluminum hydrosilicates which, owing to their particular chemical structure, have a three-dimensional network with defined pores and channels in the crystal. Both natural and synthetic zeolites are suitable for the process of the present invention, with preference being given to zeolites having an $SiO_2$—$Al_2O_3$ molar ratio of from 4:1 to 100:1, particularly preferably an $SiO_2$—$Al_2O_3$ molar ratio of from 6:1 to 90:1 and very particularly preferably an $SiO_2$—$Al_2O_3$ molar ratio of from 10:1 to 80:1. The primary crystallites of the zeolites preferably have a size of up to 0.5 mm, preferably up to 0.1 mm and particularly preferably up to 0.05 mm.

The zeolites which can be used in the process of the present invention are used in the H form. In this form, acidic OH groups are present in the zeolite. If the zeolites are not obtained directly in the H form in the process for producing them, they can easily be converted into the catalytically active H form by acid treatment using, for example, mineral acids such as hydrochloric acid, sulfuric acid or phosphoric acid or by thermal treatment of suitable precursor zeolites which, for example, contain ammonium ions, for example by heating to from 450 to 600° C., preferably from 500 to 550° C. Examples of zeolites which can be employed according to the present invention are zeolites of the mordenite type, beta-zeolites, zeolites of, for example, the MCM-22 type or Faujasite.

The heterogeneous catalysts which can be employed according to the present invention can be used in the form of powders, for example when the process is carried out by the suspension method, or advantageously as shaped bodies, e.g. in the form of cylinders, spheres, rings, spirals or granules, particularly when a fixed bed of catalyst is used in the process of the present invention.

As monomer, it is possible in principle to use any THF, preferably THF containing less than 100 ppm of unsaturated compounds and molecular oxygen. Preference is given to using commercially available THF which has been prepurified by acid treatment, for example as described in EP-A 003 112, or by distillation.

The polymerization is generally carried out at from 0 to 80° C., preferably from 25 to 75° C. and particularly preferably from 40 to 70° C. The pressure employed is generally not critical for the result of the polymerization, which is why the process is generally carried out at atmospheric pressure or under the autogenous pressure of the polymerization system.

To avoid formation of ether peroxides, the polymerization is advantageously carried out under an inert gas atmosphere. Inert gases which can be used are, for example, nitrogen, carbon dioxide or noble gases; preference is given to using nitrogen.

The polymerization can also be carried out in the presence of hydrogen at hydrogen pressures of from 0.1 to 10 bar.

The process of the present invention is preferably carried out continuously, but it is also possible for it to be carried out batchwise.

The reaction can be carried out in conventional reactors or reactor assemblies suitable for continuous processes in a suspension or fixed-bed mode, for example in loop reactors or stirred reactors in the case of a suspension process or in tube reactors or fixed-bed reactors in the case of a fixed-bed process.

When a continuous polymerization apparatus is used, the catalyst can, if desired, be pretreated after it has been introduced into the reactor(s). Suitable pretreatments for the catalyst are, for example, drying by means of gases, for example air or nitrogen, which have been heated to 80–200° C., preferably 100–150° C., or pretreatment with a reducing agent as is described in DE 196 41 481 for the supported catalysts which are preferred according to the present invention and comprise, as active composition, a catalytically active amount of at least one oxygen-containing molybdenum and/or tungsten compound. However, the catalyst can of course also be used without pretreatment.

In a fixed-bed process, the polymerization apparatus can be operated in the upflow mode, i.e. the reaction mixture is conveyed from the bottom upward, or in the downflow mode, i.e. the reaction mixture is conveyed through the reactor from the top downward. The feed mixture comprising THF and part of the telogen and/or comonomer is introduced continuously at the first addition point of the polymerization apparatus. Further amounts of telogen and/or comonomer are added at the second or further addition points. The space velocity is from 0.05 to 0.8 kg of THF/

(l·h), preferably from 0.1 to 0.6 kg of THF/(l·h) and particularly preferably from 0.15 to 0.5 kg of THF/(l·h).

Furthermore, the polymerization reactor can be operated in a single pass, i.e. without product recirculation, or in the circulation mode, i.e. the polymerization mixture leaving the reactor is circulated. In the circulation mode, the ratio of recirculated mixture to fresh feed is less than or equal to 100:1, preferably less than 50:1 and particularly preferably less than 40:1.

EXAMPLES

The invention is illustrated by the examples below.

Molecular Weight Determination

The mean molecular weight $M_n$, namely the number average molecular weight defined as the mass of all PTHF molecules divided by their amount in mol, is determined by measurement of the hydroxyl number of the polytetrahydrofuran. The hydroxyl number is the amount of potassium hydroxide in mg which is equivalent to the amount of acetic acid bound by 1 g of substance on acetylation. The hydroxyl number is determined by esterification of the hydroxyl groups present by means of an excess of acetic anhydride.

$$H-[O(CH_2)_4]_n-OH+(CH_3CO)_2O \rightarrow CH3CO-[O(CH_2)_4]_n-O-COCH_3+H_2O$$

After the reaction, the excess acetic anhydride is hydrolyzed with water in accordance with the following reaction equation $$(CH_3CO)_2O+H_2O \rightarrow 2CH_3COOH$$

and backtitrated as acetic acid using sodium hydroxide.

Example 1

Production of the Catalyst

Titanium dioxide (VKR 611 from Sachtleben) was calcined at 500° C. in a continuous rotary tube so as to give a material having a BET surface area of 135 m²/g and a loss on ignition of 8.1% by weight. 73.81 kg of this titanium dioxide were mixed in a pan mill with 29.64 kg of ammonium paratungstate, 21.73 kg of oxalic acid dihydrate and 17.7 kg of water for 1 hour, extruded to form extrudates having a diameter of 3 mm and dried at 90° C. for 3 hours. The extrudates were subsequently calcined at 400° C. for 5 hours and at 630° C. for 40 minutes.

Continuous Polymerization of THF

Comparative Examples C 1 to 4

A 3 300 ml atmospheric-pressure glass reactor which was provided with a heating mantle and an external stirrer and in which the region of the stirrer was separated from the remainder of the reactor by means of a wire mesh was charged with 2 410 g of catalyst as described in Example 1. Catalyst and reactor were subsequently dried at 200° C. in a stream of $N_2$. After the catalyst had been introduced, the reactor was cooled to 60° C. and started up using a mixture of 1,4-butanediol in THF (tetrahydrofuran). Samples were taken daily at the outlet from the reactor and were freed of unreacted THF and 1,4-butanediol by heating at 120° C. at 0.3 mbar.

The evaporation residue obtained in this way corresponds approximately to the THF conversion and is defined as $$ER=m(\text{distillation residue})/m(\text{sample}).$$

The productivity is in turn defined as $$Prod=ER*m(\text{feed})/t/m(\text{catalyst})$$

where m is the mass in g, t is the residence time in hours and feed refers to the reaction mixture fed into the reactor.

The number average molecular weight was then measured on the PTHF obtained in this way. The amount of butanediol fed in was subsequently varied until the number average molecular weight of the PTHF was 2 000±50 on three successive days. The evaporation residue and the molecular weight of the PTHF were then determined. The results are shown in table 1.

Comparative Example C 5

602.5 g of catalyst as described in Example 1 were placed in each reactor of a cascade of four of the atmospheric-pressure glass reactors described for comparative examples 1 to 4 and the catalyst and reactors were subsequently dried at 200° C. in a stream of $N_2$. The reactors were operated as a cascade of stirred tanks. After the catalyst had been introduced, the reactors were cooled to 60° C. and started up using a mixture of 1,4-butanediol in THF (tetrahydrofuran). 100% of the telogen 1,4-butanediol was added upstream of the first reactor. Samples were taken daily at the outlet from the last reactor of the cascade and were freed of unreacted THF and 1,4-butanediol by heating at 120° C. at 0.3 mbar.

The number average molecular weight of the PTHF obtained was then measured and the evaporation residue after the fourth reactor was determined. The number average molecular weight of the PTHF after the last reactor was 1 989 g/mol. The results and the total throughputs are shown in table 1.

TABLE 1

Comparative examples C 1 to C 5

| Comparative examples | THF throughput (g/h) | 1,4-BDO[1] throughput (g/h) | $M_n$[2] (g/mol) | ER[3] (%) | Prod[4] (g/kg/h) |
|---|---|---|---|---|---|
| C 1 | 1 000 | 3.4 | 1 981 | 4.6 | 19.2 |
| C 2 | 498 | 2.31 | 2 034 | 6.8 | 14.2 |
| C 3 | 332 | 1.82 | 2 021 | 8.3 | 11.5 |
| C 4 | 249 | 1.53 | 1 993 | 9.6 | 10.0 |
| C 5 | 499 | 2.09 | 1 989 | 6.7 | 14.0 |

[1] = 1,4-Butanediol
[2] = Number average molecular weight
[3] = Evaporation residue
[4] = Productivity Examples 2 to 7

602.5 g of catalyst as described in Example 1 were placed in each reactor of a cascade of four of the atmospheric-pressure glass reactors described for comparative examples 1 to 4 and the catalyst and reactors were subsequently dried at 200° C. in a stream of $N_2$. The reactors were operated as a cascade of stirred tanks. After the catalyst had been introduced, the reactors were cooled to 60° C. and started up using a mixture of 1,4-butanediol in THF (tetrahydrofuran). Upstream of each reactor unit of the cascade of stirred tanks, the indicated proportions of the total amount of 1,4-butanediol were fed in by means of a metering pump. The amount was in each case determined by means of an analytical balance. Samples were taken daily at the outlet from the last reactor of the cascade and were freed of unreacted THF and 1,4-butanediol by heating at 120° C. at 0.3 mbar.

The number average molecular weight of the PTHF obtained in this way was then measured. The amounts of butanediol metered in were subsequently varied until the number average molecular weight of the PTHF after the last reactor was 2000±50 on three successive days. The evaporation residue and the molecular weight of the PTHF after each reactor were then determined. The results for the individual reactors are reported after each example below. The results for the fourth reactor and the total throughputs are shown in table 3.

Example 2

In Example 2, 25% by weight of the total amount of 1,4-butanediol were added upstream of the first reactor. Table 2 shows the total throughputs and the number average molecular weight, the evaporation residue ER after the last reactor and the productivity.

| Reactor No. | ER[1] (%) | $M_n$[2] (g/mol) |
|---|---|---|
| 1 | 5.2 | 3 384 |
| 2 | 6.6 | 2 631 |
| 3 | 7.1 | 2 259 |
| 4 | 7.6 | 2 026 |

[1] = Evaporation residue
[2] = Number average molecular weight

Example 3

In the cascade of stirred vessels operated in example 3, 1,4-butanediol was added in four parts, namely 40% by weight upstream of the first reactor, 30% by weight before the second reactor, 20% by weight before the third reactor and 10% by weight before the fourth reactor. Table 2 shows the total throughputs and the number average molecular weight, the evaporation residue ER after the last reactor and the productivity.

| Reactor | ER[1] (%) | $M_n$[2] (g/mol) |
|---|---|---|
| 1 | 3.8 | 2 521 |
| 2 | 5.5 | 2 187 |
| 3 | 6.7 | 2 053 |
| 4 | 7.9 | 2 012 |

[1] = Evaporation residue
[2] = Number average molecular weight

Examples 4, 5, 6 and 7

In the cascades of stirred vessels operated in Examples 4, 5, 6 and 7, 1,4-butanediol was added in four parts at different total throughputs, namely 50% by weight upstream of the first reactor, 25% by weight before the second reactor, 15% by weight before the third reactor and 10% by weight before the fourth reactor.

| Example | Reactor No. | ER (%) | $M_n$ (g/mol) |
|---|---|---|---|
| 4 | 1 | 2.6 | 1 805 |
|  | 2 | 4.4 | 1 811 |
|  | 3 | 6.1 | 1 892 |
|  | 4 | 7.9 | 2 007 |
| 5 | 1 | 1.5 | 1 729 |
|  | 2 | 2.7 | 1 758 |
|  | 3 | 3.9 | 1 869 |
|  | 4 | 5.2 | 2 011 |
| 6 | 1 | 3.5 | 1 874 |
|  | 2 | 5.8 | 1 859 |
|  | 3 | 7.8 | 1 907 |
|  | 4 | 9.9 | 2 005 |
| 7 | 1 | 4.2 | 1 873 |
|  | 2 | 6.9 | 1 871 |
|  | 3 | 9.3 | 1 941 |
|  | 4 | 11 | 2 006 |

Table 2 shows the total throughputs, the number average molecular weight, the evaporation residue ER after the last reactor and the productivity.

TABLE 2

Examples 2 to 7

| Examples | Total THF throughput (g/h) | Total 1,4-BDO[1] throughput (g/h) | $M_n$[2] (g/mol) | ER[3] (%) | Prod[4] (g/kg/h) |
|---|---|---|---|---|---|
| 2 | 496 | 3.92 | 2 026 | 7.6 | 15.8 |
| 3 | 498 | 2.78 | 2 012 | 7.9 | 16.4 |
| 4 | 498 | 2.53 | 2 007 | 7.9 | 16.4 |
| 5 | 1 000 | 3.64 | 2 011 | 5.2 | 21.7 |
| 6 | 332 | 2.03 | 2 005 | 9.9 | 13.7 |
| 7 | 248 | 1.72 | 2 006 | 11.5 | 12.0 |

[1] = 1,4-Butanediol
[2] = Number average molecular weight
[3] = Evaporation residue
[4] = Productivity Comparison of the examples according to the present invention with the comparative examples in which the THF throughputs were comparable shows that higher productivities can be achieved by means of the process of the present invention.

We claim:

1. A process for the single-stage preparation of polytetrahydrofuran and/or tetrahydrofuran copolymers having a mean molecular weight of from 650 to 5000 dalton by polymerization of tetrahydrofuran over an acid catalyst in the presence of at least one telogen and/or comonomer, wherein the telogen and/or comonomer is added at at least two addition points in different segments of the polymerization reactor or cascade of at least two polymerization reactors.

2. A process as claimed in claim 1, wherein a heterogeneous acid catalyst is used.

3. A process as claimed in claim 1, wherein telogen and/or comonomer is added at from 2 to 5 addition points in different segments of the polymerization reactor or cascade of at least two polymerization reactors.

4. A process as claimed in claim 1, wherein a segment of the cascade of polymerization reactors is a tank reactor or tube reactor.

5. A process as claimed in claim 1, wherein the polymerization reactor is a single reactor which is divided into segments by means of suitable internals.

6. A process as claimed in claim 1, wherein at least 5% by weight of the telogen and/or comonomer are added after the first addition point.

7. A process as claimed in claim 1, wherein the control parameter employed for the addition of the telogen and/or comonomer in the individual segments is the mean molecular weight of the PTHF or THF copolymer or the productivity in these segments.

8. A process as claimed in claim 1, wherein polytetrahydrofuran is prepared from tetrahydrofuran and 1,4-butanediol, water and/or polytetrahydrofuran having a molecular weight of from 200 to 700 dalton as telogen.

\* \* \* \* \*